Sept. 25, 1956 J. L. BUIE 2,764,725
DIRECT CURRENT POWER SUPPLY OR THE LIKE
Filed March 3, 1954

JAMES L. BUIE
*INVENTOR.*

BY

HIS ATTORNEY

United States Patent Office 2,764,725
Patented Sept. 25, 1956

2,764,725

DIRECT CURRENT POWER SUPPLY OR THE LIKE

James L. Buie, Sun Valley, Calif., assignor to Hoffman Electronics Corporation, a corporation of California Application March 3, 1954, Serial No. 413,893

3 Claims. (Cl. 321—18)

This invention is related to direct current power supplies and more particularly to an improved direct current power supply which will produce a constant regulated output voltage despite changes in line voltage.

In the past, many circuits have been employed to supply direct current power to electronic circuitry. Invariably certain problems are encountered which render regulated power supply circuits presently in use deficient in some respect. Difficulties center in the fact that appreciable changes in line voltage produce marked deviations in power supply output voltage.

Therefore, it is an object of this invention to provide an improved direct current power supply circuit.

It is a further object of this invention to provide an improved direct current power supply circuit which will be relatively inexpensive to manufacture, and which will also produce an output voltage substantially independent of changes in line input voltage.

According to this invention, the power supply line voltage is fed into the primary windings of a transformer having a core exhibiting a rectangular hysteresis loop and a saturation flux density characteristic which is constant and well-defined so that, as long as the line input voltage is sufficient to create a maximum flux density in the core, then, regardless of changes of input voltage, the average voltage induced in the secondary windings during each half cycle will be very nearly constant, thus producing a constant power supply output voltage.

The features of the present invention which are believed to be novel are set forth with particularity in the appended claims. The present invention, both as to its organization and manner of operation, together with further objects and advantages thereof, may best be understood by reference to the following description, taken in connection with the accompany drawings, in which:

Figure 1:
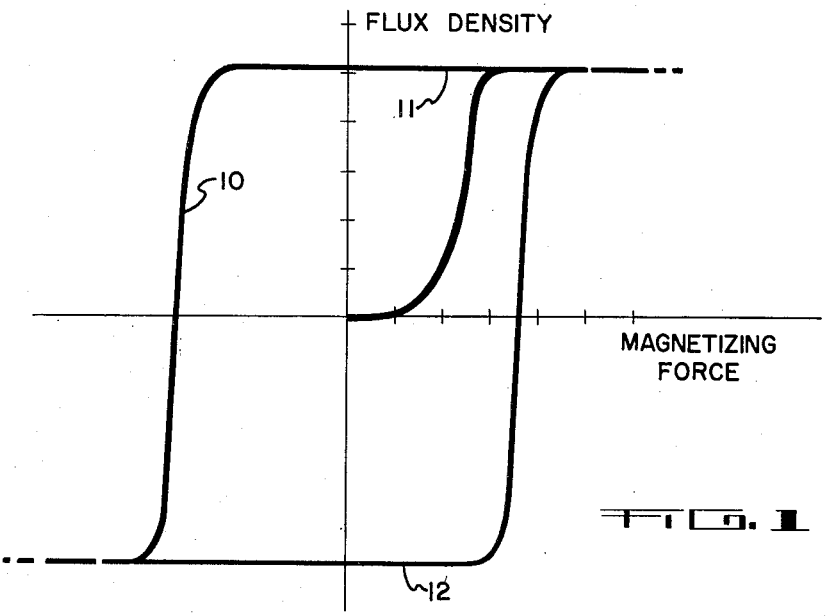
Figure 1 is a diagrammatic representation of the rectangular hysteresis loop exhibited by the core of a transformer or single-winding reactor to be employed in this invention.

There are many materials in production today which exhibit unique characteristics when employed as transformer cores. The particular characteristic in which this invention is interested is that of the rectangular hysteresis loop, as shown in Figure 1. Hysteresis loop 10 is obtained from plotting the magnetizing force exerted upon a core material against the induced flux density. Portions 11 and 12 of hysteresis loop 10 indicate that once saturation is achieved, flux density of the core is independent, to all intent and purposes, of the magnetizing force applied. It becomes immediately apparent that if this material is incorporated in a transformer, then, so long as the input line voltage is such as to induce a magnetic field in the core equal to the core's saturation value, that, despite further increases in the line voltage, the output voltage of the transformer will remain substantially the same. This phenomenon is readily adaptable to power supply circuitry as shown in Figure 2.

Figure 2:
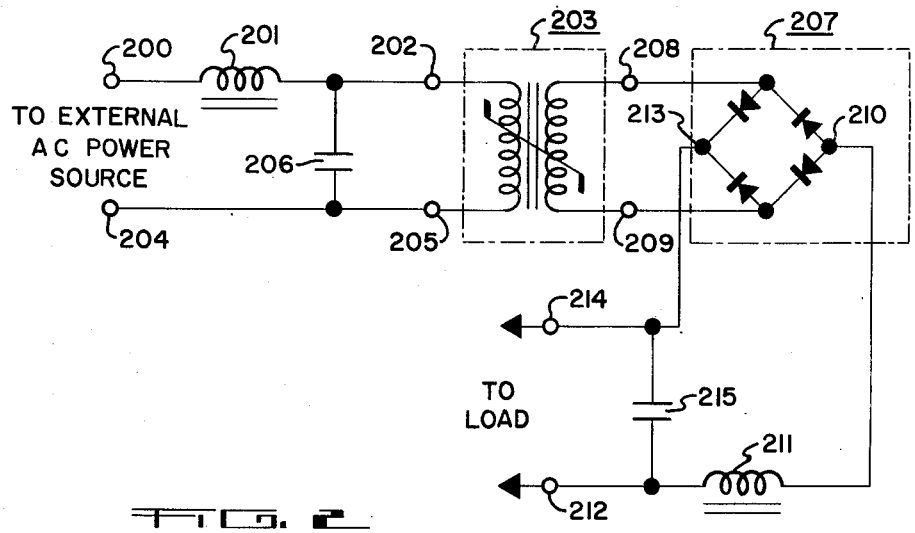
Figure 2 is a schematic diagram of a direct current power supply circuit according to this invention.

In Figure 2, input terminal 200 is connected through inductor 201 to primary terminal 202 of transformer 203. Input terminal 204 is directly connected to primary terminal 205 of transformer 203. Capacitor 206 is connected between primary terminals 202 and 205. Diode bridge circuit 207 is connected between secondary terminals 208 and 209 of transformer 203. Junction 210 of diode bridge circuit 207 is connected through inductor 211 to load terminal 212. Junction 213 of diode bridge 207 is connected to output load terminal 214. Capacitor 215 is connected across output load terminals 212 and 214.

The circuit described in Figure 2 operates as follows. Terminals 200 and 204 are connected to an external alternating current power source (not shown). Inductor 201 and capacitor 206 serve as a charging circuit for the primary coil of transformer 203. When resonant at the line frequency, this charging circuit serves as a series resonant circuit, increasing the effective voltage across the primary of transformer 203 and thus causing core saturation to be quickly achieved. Also, because of the voltage amplification produced by the charging circuit, the line voltage can drop appreciably while retaining saturation of the transformer core. When saturation is achieved, the time rate of change of flux reduces to zero, and the induced voltage across the transformer primary likewise becomes zero, thus effectively short-circuiting capacitor 206. The entire line voltage thus becomes impressed across inductor 201. During this circuit condition, inductor 201 serves as a current limiter to prevent excessive current flow through the primary of transformer 203.

Diode bridge circuit 207 serves as a full-wave rectifier for the power supply. The power supply output circuit is connected to junctions 213 and 210 of diode bridge circuit 207 and, as a result, direct current flow in the secondary coil of transformer 203 and any attendant hysteresis loop distortion are prevented. Inductor 211 and capacitor 215 serves as a conventional L type filter circuit.

It is accordingly seen that, so long as the input line voltage is sufficient for the transformer coil to operate at saturation, i. e., along curve segments 11 and 12 of Figure 1, constituting the saturation limits of the core, then regardless of changes in line voltage, the output voltage across terminals 212 and 214 of the power supply will be relatively constant.

Referring again to Figure 2, capacitor 206 may be eliminated and inductor 201 may be replaced by a current limiting resistor, where efficiency of the power supply circuit is not of prime importance. Voltage requirements may permit replacement of transformer 203 by a single-winding reactor having a core exhibiting a rectangular hysteresis loop. While the present circuit is shown as a single phase circuit, it is adaptable to a multiphase power system. Also, any full-wave rectifier may be substituted for diode bridge circuit 207. In addition, any smoothing filter might replace inductor 211 and capacitor 215.

It will be apparent to those skilled in the art that a power supply embodying the present invention will be suited to all electronic circuits, including transistor circuits, where it is important to maintain a constant direct current voltage which is independent of variations in line voltage.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A direct current power supply including, in combination, two input terminals for connection to a source of alternating current, an inductor, a capacitor, and a transformer with a primary coil having two terminals, a secondary coil having two terminals, and a saturable core having a constant saturation flux characteristic, one of said input terminals being connected through said inductor to one of said terminals of said primary coil, the remaining input terminal being connected to the remaining terminal of said primary coil, and said capacitor being connected between said two terminals of said primary coil, and an output circuit including a full-wave rectifier and a filter, said output circuit being connected across said terminals of said secondary coil of said transformer.

2. A direct current power supply including, in combination, two input terminals for connection to a source of alternating current, an inductor, a capacitor, and a transformer with a primary coil having two terminals, a secondary coil having two terminals, and a saturable core having a constant saturation flux characteristic, one of said input terminals being connected through said inductor to one of said terminals of said primary coil, the remaining input terminal being connected to the remaining terminal of said primary coil, and said capacitor being connected between said two terminals of said primary coils, a diode bridge circuit being connected across said two terminals of said secondary coil, and a filter circuit being connected across the junction points of said diode bridge circuit.

3. A direct current power supply including, in combination, two input terminals for connection to a source of alternating current, an inductor, a capacitor, and a transformer with a primary coil having two terminals, a secondary coil having two terminals, and a saturable core having a constant saturation flux characteristic, one of said input terminals being connected through said inductor to one of said terminals of said primary coil, the remaining input terminal being connected to the remaining terminal of said primary coil, a full-wave rectifier, and a filter circuit, said full-wave rectifier being connected across said two terminals of said secondary coil, and said full-wave rectifier being connected to said filter circuit.

References Cited in the file of this patent
UNITED STATES PATENTS

| | | |
|---|---|---|
| 2,442,960 | Pohm | June 8, 1948 |
| 2,725,515 | Horton | Nov. 29, 1955 |
| 2,739,282 | Evans | Mar. 20, 1956 |